No. 897,817. PATENTED SEPT. 1, 1908.
V. CHAVÉRIAT.
APPARATUS FOR ADJUSTING RAILWAY VEHICLE AND LIKE BRAKES.
APPLICATION FILED MAY 28, 1908.
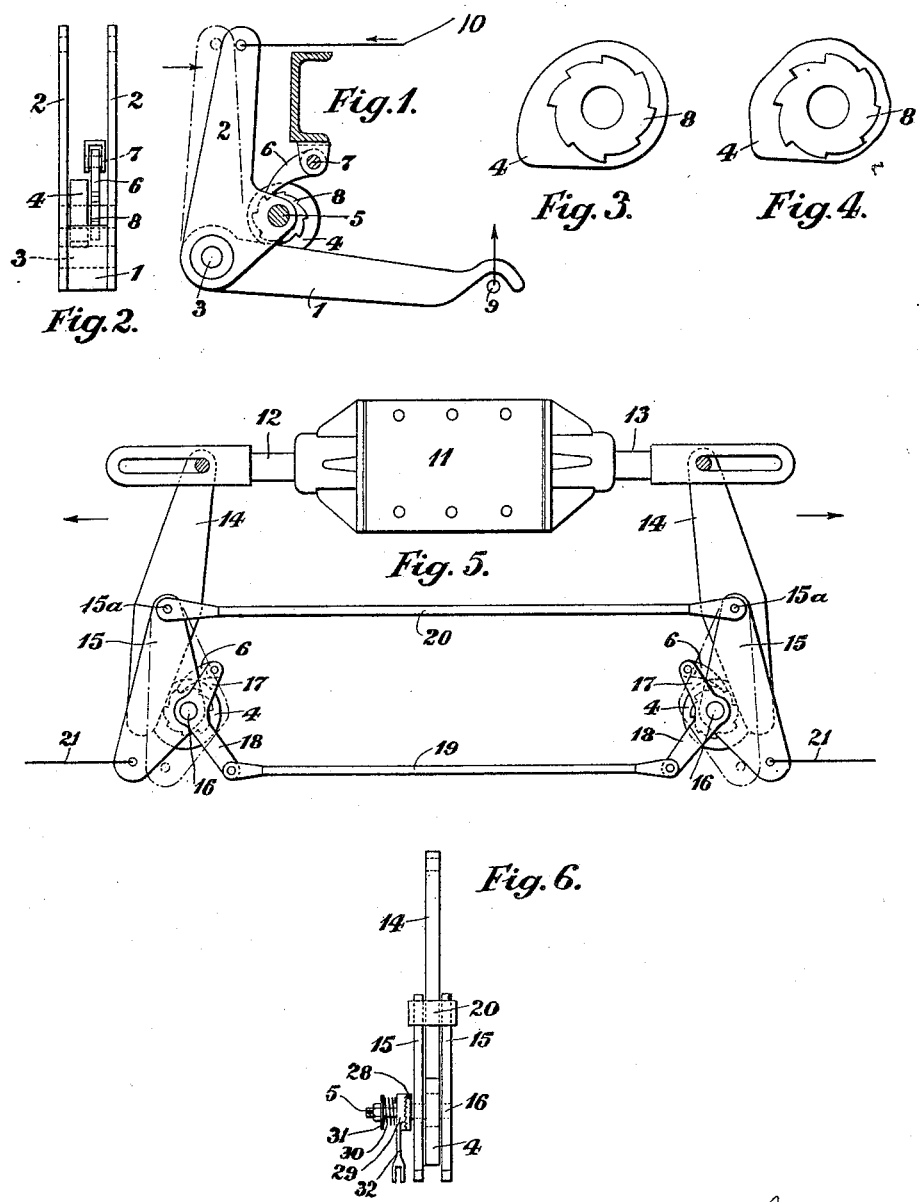

UNITED STATES PATENT OFFICE.

VICTOR CHAVÉRIAT, OF PARIS, FRANCE, ASSIGNOR OF ONE-HALF TO JOHN PATRICK O'DONNELL, OF WESTMINSTER, ENGLAND.

APPARATUS FOR ADJUSTING RAILWAY-VEHICLE AND LIKE BRAKES.

No. 897,817.  Specification of Letters Patent.  Patented Sept. 1, 1908.

Application filed May 28, 1908. Serial No. 435,588.

*To all whom it may concern:*

Be it known that I, VICTOR CHAVÉRIAT, a citizen of the Republic of France, residing at Paris, in the Republic of France, (whose post-office address is 3 Rue Alphonse Daudet,) have invented certain new and useful Improvements in Apparatus for Adjusting Railway-Vehicle and Like Brakes; and I do hereby declare the following to be a full, clear, and exact description of the invention, such as will enable others skilled in the art to which it appertains to make and use the same.

This invention consists in improvements in apparatus for automatically adjusting the brake mechanism of railway vehicles and the like in order to take up or compensate for slackness in the brake rigging and wear of the brake shoes or blocks. Heretofore many attempts have been made to provide apparatus of this character. In some cases it has been proposed to employ ratchet or rack bars in connection with the brake pull-rods and a pawl or pawls for engaging successive teeth on the rack, as wear of the brake blocks takes place, so as to adjust the brake connections and maintain the blocks at a practically constant distance from the wheels. In other cases it has been proposed to employ a ratchet wheel and pawl operating a nut or threaded sleeve working on a threaded part of or in connection with the brake pull-rod, or other movable part of the brake mechanism, the nut being turned by the ratchet gear, on the return stroke or movement of the parts, so as to adjust the brake connections and brake blocks to take up or compensate for wear. It has also been proposed to employ a cam or cams pivotally mounted on a movable part of the brake mechanism, ratchet teeth being provided on the cam and a pawl coöperating with the said ratchet teeth so as to turn the cam and so adjust the brake blocks. In one case in which it was proposed to employ a ratchet bar and coöperating pawls, the ratchet bar was operatively connected to one of two independently rotatable arms mounted on a common shaft or center the said arms being mounted in a special bracket or frame and a loose wedge interposed between the frame and the arm connected to the ratchet bar so that on wear of the brake blocks taking place and movement being consequently given to the arm by the ratchet and pawl mechanism the wedge automatically drops so as to hold the arm and consequently the brake connections in the new position, or, in other words, preventing the said arm returning through its full normal movement should wear of the blocks have taken place.

In some of the devices heretofore proposed and above referred to the means for effecting the adjustment of the brake blocks has been brought into action on the forward stroke or movement of the brake operating connections for applying the brake blocks to the wheels, while in other cases the adjusting means has been brought into action on the return stroke or movement by which the brake blocks are withdrawn from the wheels. All of these prior apparatuses however have been of a more or less complicated nature, and in addition have been open to objection for other reasons, for instance, the pawl and rack or ratchet gear has in some cases been subjected to the whole or a considerable portion of the strain put upon the apparatus for applying the brakes, while in the case of the ratchet and screw gear above referred to the ratchet operated nut or sleeve is liable, from various causes, to jam on the screw and thus render the apparatus inoperative.

The present invention has for its object to provide simple and efficient means for automatically adjusting the brake mechanism so as to take up or compensate for slackness and wear of the brake blocks.

The invention consists principally of an adjusting lever or crank device comprising a rotatable cam or block mounted between two arms or parts articulated or pivoted so as to be capable of turning in relation to each other, the said cam being provided with or operatively connected to a ratchet wheel or ratchet teeth with which a pawl coöperates, the arrangement being such that in the case of an abnormal stroke or movement of the said parts or arms (due to slackness in the brake rigging or wear of the brake blocks) in applying the brakes the pawl will engage a new or succeeding tooth of the ratchet and the cam or block will be rotated by the pawl and will act so as to prevent a full or normal return movement of the connections (in effect varying the length of the brake pull-rod or operating connection) so that the brake blocks move from the wheel rims to a lesser extent—corresponding to the slackness or wear of the brake blocks—than under normal conditions when there is no slackness or wear, the brake blocks being thus maintained at the proper distance from the wheel rims so that the normal movement of the brake operating piston or prime mover of the brake mechanism for applying the brakes is as nearly as possible constant, i. e. the same for applying the brake shoes whether they are worn or not.

The apparatus according to this invention is such that it imposes a minimum of alteration and addition to existing brake mechanisms.

Further features of the invention will appear from the following description with reference to the accompanying drawings, and from the claims.

The accompanying drawings illustrate the invention.

Figure 1 shows an application of the invention to the well known vacuum brake apparatus. Fig. 2 is an end view of Fig. 1, looking in the direction of the arrow, but with certain parts omitted. Figs. 3 and 4 are detail views of alternative forms of the hereinbefore mentioned rotatable cam or block. Fig. 5 shows an application of the invention to the well known Westinghouse brake apparatus. Fig. 6 is an end view of the automatic adjusting apparatus shown in Fig. 5, but illustrates an alternative form of ratchet and pawl mechanism for operating the cam as hereinafter described.

Like reference numbers indicate corresponding parts in the several figures of the drawings.

Referring to Fig. 1, 1 and 2 are arms or levers articulated or pivotally mounted on the bolt or rock shaft 3 in such a way that the said arms or levers are capable of turning in relation to each other. 2 is preferably a double arm or lever (see Fig. 2) the end of the arm 1 on the bolt or shaft 3 lying between the two arms or like parts of the said arm or lever 2. 4 is a cam or block rotatably mounted on the arm or lever 2, this cam or block in the example shown being between the two arms or parts of the lever 2 and rotatable on the bolt or spindle 5 mounted in enlarged or projecting portions of the arms or levers 2. 6 is a pawl pivoted at 7 on the end frame or other suitable fixed part of the vehicle structure, 8 being a ratchet wheel or ratchet teeth which may be preferably formed on the side or sides of the block or cam 4 as clearly shown in Figs. 2 and 3, the spindle 5 of the cam in these examples being also formed on the cam block. 9 indicates the point of connection of the piston rod of the well known vacuum brake cylinder to the arm or lever 1 which lever, in the example shown, corresponds to the well known cylinder lever, the direction of movement of the brake piston for applying the brakes being indicated by the vertical arrow. 10 indicates the pull-rod or connection from the arm or lever 2 for transmitting movement therefrom to the brake shoes through the known or any suitable system of brake rigging.

The working according to Fig. 1 is as follows:—Assuming there is no slackness of the brake rigging or wear of the brake blocks, on the piston of the brake cylinder moving upward the arm or lever 1 is, as usual, rotated on or with the shaft 3, and the movement of this lever is transmitted to the arm or lever 2 through the cam 4 so that the rod 10 is actuated to apply the brakes in the well known manner; when the pressure in the brake cylinder is released the brake shoes drop off or move away from the wheels, the brake rigging together with the levers 2 and 1 returning to the normal position shown. During this movement of the brake mechanism for applying and releasing the brakes, assuming there is no slackness in the mechanism and no wear of the brake shoes, the movement of the cam 4 with the levers 1 and 2 will be such that the end of the pawl 6 will merely ride to and fro on the tooth of the ratchet wheel 8 with which it is in engagement, no turning movement being given to the cam; should however a predetermined amount of slackness in the rigging or wear of the brake shoes have taken place, which as is well known will necessitate an extra movement of the brake piston and brake operating connections in order to properly apply the brake blocks to the wheels, the cam 6, owing to this additional movement, will be moved bodily with the arms or levers 2 and 1 far enough for the end of the pawl 6 to drop off the tooth with which it was in engagement into engagement with the next tooth on the ratchet 8; when now the pressure in the brake cylinder is released and the brakes come off (in the usual manner), the lever or arm 2, which carries the cam 6, turning towards the right (Fig. 1) the cam will be rotated and will act on the levers or arms 2 and 1 so as to prevent the full return movement of the lever or arm 2, and consequently of the pull-rod 10 (or other operating connections between the lever 2 and the brake shoes), so that the brake shoes will be retained at the proper distance from the wheels for insuring the proper application of the brakes on power being again applied to the lever 1. The dotted line position of the arm 2 indicates a position of or movement given to the said arm by a rotation of the cam 6 as above described.

Referring to Fig. 5 which illustrates an application of the invention to the well known Westinghouse brake apparatus, 11 indicates the brake cylinder and 12 the piston rod, 13 being the usual rod or projection at the opposite end of the cylinder 11. In this case the horizontal cylinder lever consists of two articulated or pivoted parts 14, 15, the part 15 being double and the part 14 lying between the parts of 15 as shown in Fig. 6. The part 15 is articulated or pivoted to the part 14 by means of a pin or bolt 15ᵃ. The cam 4 in this case is carried by the part 15 of this compound horizontal lever, being pivotally mounted at 16, and the pawl 6 is pivoted to the arm or arms 17 of a bell crank lever also pivoted at 16, the arm or arms 18 of this bell crank lever being pivotally attached to an operating rod or connection 19 which is also pivotally connected to the corresponding arm 18 of the similar apparatus shown at the right hand end of Fig. 5. The parts 15 of the compound levers at each end of the brake cylinder are connected by a rod 20 which is equivalent to the rod connection between the two cylinder levers of the well known Westinghouse brake apparatus. 21, 21 indicate the pull-rods or operating connections to the usual floating levers and rod and link mechanism (or to other suitable rigging) through which movement is transmitted to the brake blocks.

In the case where a brake cylinder is employed for operating the brake blocks of the wheels at one end only of the vehicle the above mentioned rod 19 (for operating the ratchet mechanism so as to turn the cam 4 as described) may be operatively connected to a suitable part of the vehicle structure or of the brake mechanism.

The working according to the construction shown in Fig. 5 is as follows:—Assuming there is no slackness in the brake connections or wear of the shoes, on power being applied to the piston in the brake cylinder the cylinder lever, consisting of the articulated parts 14, 15, will be moved in the direction of the arrow and the brake blocks will be applied in the well known way; on pressure being released from the cylinder 11 the brake shoes will come off and the brake mechanism or connections will return to the normal position. During these movements the bell crank lever carrying the pawl 6 will be turned to an extent sufficient to merely cause the end of the pawl 6 to ride to and fro on the tooth of the ratchet 8. On a predetermined amount of slackness or wear arising in the brake mechanism, necessitating an extra travel of the brake piston and brake operating connections to apply the brake shoes to the wheels, the bell crank lever with pawl 6 will be turned to a correspondingly greater extent, sufficient to permit the pawl 6 to drop into engagement with the next tooth of the ratchet 8 so that on releasing the pressure of the brake cylinder and the brake mechanism returning towards the normal position the cam 4 will, through the pawl 6 and ratchet 8, be revolved and will, by acting on the part 14 of the cylinder lever, cause a backward movement of the part 15 (for instance to the position shown by dotted lines),—or in other words the rotation of the cam will prevent the return of the part 15 and consequently of the brake operating connections thereto to the full normal position,—thus holding the brake blocks nearer to the wheels to an extent corresponding to the slackness or wear of the shoes so that on further applications of power to the mechanism for applying the brakes the shoes will efficiently act on the wheels. It will be seen that through the rod 19 connecting the bell crank levers carrying the pawls 6 at each end of the brake cylinder the action will be precisely the same at each end, both the parts 15 of the cylinder levers being correspondingly adjusted.

Referring to Fig. 6, in lieu of the pawl 6 and ratchet 8 hereinbefore described, a crown ratchet wheel 28 is fixed on the shaft or spindle 5 (or on an extension thereof) of the cam 4, and a similar crown gear or pawl device 29, having oppositely inclined ratchet teeth, is rotatably mounted on the cam shaft 5, 30 being a spring on the shaft 5, between the crown gear 29 and a suitable washer and nut 31, the said spring serving to hold the teeth of 29 in engagement with the teeth of the crown ratchet 28; 32 is an arm or lever formed on or connected to the crown ratchet 29 this arm or lever being pivotally connected to the rod 19, Fig. 5. The action of this ratchet mechanism for rotating the cam 4 is the same as described with reference to Fig. 5.

The hereinbefore mentioned cam or block 4 is preferably shaped in the form of a logarithmic spiral (Fig. 2), or of a polygon (Fig. 3) the sides or faces of which form tangents to an inscribed logarithmic spiral.

Although I have more particularly described and shown the automatic brake adjusting apparatus according to this invention as applied to power operated brakes of the well known vacuum and Westinghouse types, yet it will be readily understood by those skilled in the art that the adjusting apparatus can be applied to other types of brake apparatus, for instance, it can be readily applied to existing hand-operated brake apparatus as now in use on railway goods wagons.

The details of the apparatus as hereinbefore described and shown can of course be varied; for instance, instead of the cam 4 being mounted on the arm or lever 2, as described and shown, it can be rotatably mounted on the arm or lever 1 which may be provided with a suitable projecting portion to receive the spindle or shaft of the cam. Further the apparatus can be varied in its details and arrangement, to suit different applications or different types of brake operating gear to which it may be applied, without departing from the main features of the invention. Further instead of ratchet teeth being provided on the cam as shown, a series of projecting pins might be provided on the side or sides of the cam. Also, of course, if desired, a spring might be arranged to act on the pawl so as to insure its engaging the ratchet teeth or pins on the cam.

What I claim as my invention, and desire to secure as Letters Patent is:—

1. The combination, with a fulcrum shaft, and two levers pivoted side by side on the said shaft; of a revoluble adjusting cam supported by one of the said levers and bearing against the side of the other lever, the angle formed by the said levers being varied by turning the said cam.

2. The combination, with a fulcrum shaft, and two levers pivoted side by side on the said shaft; of a revoluble adjusting cam supported by one of the said levers and bearing against the side of the other lever, an operating wheel for revolving the said cam, a driving device for revolving the said operating-wheel step by step, and means for supporting the said driving device independent of the said levers so that it normally remains stationary while the said levers are being oscillated on their fulcrum shaft.

3. The combination, with a fulcrum shaft, and two levers pivoted side by side on the said shaft; of a revoluble adjusting cam supported by one of the said levers and bearing against one side of the other lever, a ratchet-toothed wheel secured to the said cam, a pawl for engaging with the said wheel, and a stationary support for the said pawl, the said cam being revolved step by step to adjust the relative positions of the said levers.

In testimony whereof I affix my signature, in presence of two witnesses.

VICTOR CHAVÉRIAT.

Witnesses:
  H. C. COXE,
  GEORGES BONNEUIL.